US012170065B2

(12) United States Patent
Tian et al.

(10) Patent No.: US 12,170,065 B2
(45) Date of Patent: Dec. 17, 2024

(54) PIXEL CIRCUIT, PIXEL DRIVE METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xuesong Tian, Beijing (CN); Shiming Li, Beijing (CN)

(73) Assignees: Beijing BOE Technology Development Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 18/028,038

(22) PCT Filed: Mar. 25, 2022

(86) PCT No.: PCT/CN2022/083038

§ 371 (c)(1),
(2) Date: Mar. 23, 2023

(87) PCT Pub. No.: WO2023/178654

PCT Pub. Date: Sep. 28, 2023

(65) Prior Publication Data

US 2024/0304149 A1 Sep. 12, 2024

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2300/0842* (2013.01);
(Continued)

(58) Field of Classification Search
CPC ............... G09G 3/3258; G09G 3/3291; G09G 2300/0842; G09G 2310/08;
(Continued)

(56) References Cited

U.S. PATENT DOCUMENTS 11,436,978 B2 * 9/2022 Fan ...................... G09G 3/3233
11,620,942 B2 * 4/2023 Yang .................... G09G 3/3233
345/212

(Continued)

FOREIGN PATENT DOCUMENTS

CN 108648702 A 10/2018
CN 111276097 A 6/2020

(Continued)

*Primary Examiner* — Amy Onyekaba
(74) *Attorney, Agent, or Firm* — WHDA, LLP

(57) ABSTRACT

A pixel circuit, a pixel drive method and a display device are provided. The pixel circuit includes an energy storage control circuit, an energy storage circuit, a first initialization circuit, a drive circuit, and a light-emitting element. The first initialization circuit writes a first initial voltage into a control terminal of the drive circuit under control of a first initialization control signal. The energy storage control circuit control a second end of the energy storage circuit to be connected to the first voltage terminal under control of an energy storage control signal in a refresh frame, and is configured to control the second end of the energy storage circuit to be disconnected from the first voltage terminal under control of the energy storage control signal in an initialization phase included in a hold frame and a data writing phase included in the hold frame.

15 Claims, 10 Drawing Sheets

(52) U.S. Cl.
CPC . *G09G 2310/08* (2013.01); *G09G 2320/0233* (2013.01); *G09G 2320/0247* (2013.01); *G09G 2330/021* (2013.01)

(58) Field of Classification Search
CPC ... G09G 2320/0233; G09G 2320/0247; G09G 2330/021
See application file for complete search history.

(56) References Cited

U.S. PATENT DOCUMENTS

| | | | | |
|---|---|---|---|---|
| 11,620,947 | B1 * | 4/2023 | Wu | G09G 3/3233 345/214 |
| 2013/0038621 | A1 * | 2/2013 | Choi | G06T 1/20 345/589 |
| 2014/0015820 | A1 * | 1/2014 | Choi | G09G 3/3614 345/204 |
| 2014/0368484 | A1 * | 12/2014 | Tanaka | G09G 3/3696 345/94 |
| 2015/0269885 | A1 * | 9/2015 | Ma | G09G 3/3233 345/205 |
| 2020/0126478 | A1 * | 4/2020 | Lee | G09G 3/325 |
| 2020/0160795 | A1 * | 5/2020 | Heo | G09G 3/3291 |
| 2020/0388217 | A1 * | 12/2020 | Yuan | G09G 3/3233 |
| 2021/0056895 | A1 * | 2/2021 | Lee | G09G 3/3275 |
| 2021/0225282 | A1 * | 7/2021 | Cho | G09G 3/3233 |
| 2021/0287614 | A1 * | 9/2021 | Xiong | G09G 3/3233 |
| 2022/0059030 | A1 | 2/2022 | Sang et al. | |
| 2022/0122522 | A1 | 4/2022 | Li et al. | |
| 2024/0021142 | A1 * | 1/2024 | Tian | G09G 3/3233 |

FOREIGN PATENT DOCUMENTS

| | | | |
|---|---|---|---|
| CN | 112150967 | A | 12/2020 |
| CN | 113851083 | A | 12/2021 |
| CN | 113892132 | A | 1/2022 |
| CN | 113971932 | A | 1/2022 |
| CN | 114078445 | A | 2/2022 |

* cited by examiner

PIXEL CIRCUIT, PIXEL DRIVE METHOD AND DISPLAY DEVICE

This application is the U.S. national phase of PCT Application No. PCT/CN2022/083038 filed on Mar. 25, 2022, the entire contents of which are hereby incorporated by reference.

TECHNICAL FIELD

The present disclosure relates to the technical field of displays, and more particularly, to a pixel circuit, a pixel drive method and a display device.

BACKGROUND

In the related art, organic light-emitting diode (OLED) displays have the advantages of self-luminescence, lightness and thinness, low power consumption, fast response speed and wide viewing angle while having good flexibility, so they are widely used in various fields and have broad development prospects.

SUMMARY

In an aspect, an embodiment of the present disclosure provides a pixel circuit, including an energy storage control circuit, an energy storage circuit, a first initialization circuit, a second initialization circuit, a drive circuit, and a light-emitting element; wherein a display cycle of the pixel circuit includes a refresh frame and at least one hold frame, and each of the refresh frame and the at least one hold frame comprises an initialization phase, a data writing phase, and a light-emitting phase;

the first initialization circuit is electrically connected to a first initialization control line, a first initial voltage terminal and a control terminal of the drive circuit, and is configured to write a first initial voltage provided by the first initial voltage terminal into the control terminal of the drive circuit under control of a first initialization control signal provided by the first initialization control line;

a first end of the energy storage circuit is electrically connected to the control terminal of the drive circuit, and the energy storage circuit is configured to store electric energy;

the energy storage control circuit is electrically connected to an energy storage control line, a second end of the energy storage circuit and a first voltage terminal, and is configured to control the second end of the energy storage circuit to be connected to the first voltage terminal under control of an energy storage control signal provided by the energy storage control line in the refresh frame, and to control the second end of the energy storage circuit to be disconnected from the first voltage terminal under control of the energy storage control signal in the initialization phase included in the hold frame and the data writing phase included in the hold frame;

the drive circuit is electrically connected to a first electrode of the light-emitting element; the drive circuit is configured to drive the light-emitting element under control of a potential of the control terminal of the drive circuit;

a second electrode of the light-emitting element is electrically connected to a second voltage terminal.

Optionally, in at least one embodiment of the present disclosure, the pixel circuit further includes a second initialization circuit; wherein the second initialization circuit is electrically connected to a second initialization control line, a second initial voltage terminal and the first electrode of the light-emitting element, and is configured to write a second initial voltage provided by the second initial voltage terminal into the first electrode of the light-emitting element under control of a second initialization control signal provided by the second initialization control line.

Optionally, in at least one embodiment of the present disclosure, the pixel circuit includes a first light-emitting control circuit and a second light-emitting control circuit; wherein the second terminal of the drive circuit is electrically connected to the first electrode of the light-emitting element through the second light-emitting control circuit;

the first light-emitting control circuit is electrically connected to a light-emitting control line, the first voltage terminal and a first terminal of the drive circuit, and is configured to control the first voltage terminal to be connected to or disconnected from the first terminal of the drive circuit under control of a light-emitting control signal provided by the light-emitting control line;

the second light-emitting control circuit is electrically connected to a light-emitting control line, the second terminal of the drive circuit and the first electrode of the light-emitting element, and is configured to control the second terminal of the drive circuit to be connected to or disconnected from the first electrode of the light-emitting element under control of the light-emitting control signal.

Optionally, the energy storage control line includes the light-emitting control line and a connection/disconnection control line; the energy storage control circuit includes a first control sub-circuit and a second control sub-circuit;

the second control sub-circuit is electrically connected to the connection/disconnection control line, the first voltage terminal and the second end of the energy storage circuit, and is configured to control the connection or disconnection between the first voltage terminal and the second end of the energy storage circuit under control of a connection/disconnection control signal provided by the connection/disconnection control line;

the first control sub-circuit is electrically connected to the light-emitting control line, the first voltage terminal and the second end of the energy storage circuit, and is configured to control the first voltage terminal to be connected to or disconnected from the second end of the energy storage circuit under control of the light-emitting control signal in response to control of the second control sub-circuit.

Optionally, the energy storage control circuit includes a first transistor, a control electrode of the first transistor is electrically connected to the energy storage control line, a first electrode of the first transistor is electrically connected to the first voltage terminal, and a second electrode of the first transistor is electrically connected to the second end of the energy storage circuit.

Optionally, the first control sub-circuit includes a first transistor, and the second sub-control circuit includes a second transistor;

a control electrode of the first transistor is electrically connected to the light-emitting control line, a first electrode of the first transistor is electrically connected to the first voltage terminal, and a second electrode of the first transistor is electrically connected to the second end of the energy storage circuit;

a control electrode of the second transistor is electrically connected to the connection/disconnection control line, a first electrode of the second transistor is electrically connected to the first voltage terminal, and a second electrode of the second transistor is electrically connected to the second end of the energy storage circuit.

Optionally, in at least one embodiment of the present disclosure, the pixel circuit further includes a data writing circuit and a compensation control circuit;

the data writing circuit is electrically connected to a writing control line, a data line and the first terminal of the drive circuit, and is configured to write a data voltage provided by the data line into the first terminal of the drive circuit under control of a writing control signal provided by the writing control line;

the compensation control circuit is electrically connected to a compensation control line, the control terminal of the drive circuit and the second terminal of the drive circuit, and is configured to control the control terminal of the drive circuit to be connected to or disconnected from the second terminal of the drive circuit under control of a compensation control signal provided by the compensation control line.

Optionally, the transistor included in the second initialization circuit and the transistor included in the data writing circuit are both p-type transistors, or the transistor included in the second initialization circuit and the transistor included in the data writing circuit are both n-type transistors:

the writing control line and the second initialization control line provide a same control signal.

Optionally, the first initialization circuit includes a third transistor, and the second initialization circuit includes a fourth transistor;

a control electrode of the third transistor is electrically connected to the first initialization control line, a first electrode of the third transistor is electrically connected to the first initial voltage terminal, and a second electrode of the third transistor is electrically connected to the control terminal of the drive circuit;

a control electrode of the fourth transistor is electrically connected to the second initialization control line, a first electrode of the fourth transistor is electrically connected to the second initial voltage terminal, and a second electrode of the fourth transistor is electrically connected to the first electrode of the light-emitting element.

Optionally, the first light-emitting control circuit includes a fifth transistor, the second light-emitting control circuit includes a sixth transistor, and the energy storage circuit includes a storage capacitor:

a control electrode of the fifth transistor is electrically connected to the light-emitting control line, a first electrode of the fifth transistor is electrically connected to the first voltage terminal, and a second electrode of the fifth transistor is electrically connected to the first terminal of the drive circuit;

a control electrode of the sixth transistor is electrically connected to the light-emitting control line, a first electrode of the sixth transistor is electrically connected to the second terminal of the drive circuit, and a second electrode of the sixth transistor is electrically connected to the first electrode of the light-emitting element;

a first terminal of the storage capacitor is electrically connected to the control terminal of the drive circuit, and a second terminal of the storage capacitor is the second end of the energy storage circuit.

Optionally, the data writing circuit includes a seventh transistor, and the compensation control circuit includes an eighth transistor;

a control electrode of the seventh transistor is electrically connected to the writing control line, a first electrode of the seventh transistor is electrically connected to the data line, and a second electrode of the seventh transistor is electrically connected to the first terminal of the drive circuit;

a control electrode of the eighth transistor is electrically connected to the compensation control line, a first electrode of the eighth transistor is electrically connected to the control terminal of the drive circuit, and a second electrode of the eighth transistor is electrically connected to the second terminal of the drive circuit;

In a second aspect, an embodiment of the present disclosure provides a pixel drive method applied to the pixel circuit as described above, wherein a display cycle of the pixel circuit includes a refresh frame and at least one hold frame, and the refresh frame and the hold frame each includes an initialization phase, a data writing phase, and a light-emitting phase; the pixel drive method includes:

in the refresh frame, the energy storage control circuit controlling a second terminal of an energy storage circuit to be connected to a first voltage terminal under control of the energy storage control signal;

in the initialization phase comprised in the hold frame and the data writing phase comprised in the hold frame, the energy storage control circuit controlling the second end of the energy storage circuit to be disconnected from the first voltage terminal under control of the energy storage control signal; and in the light-emitting phase comprised in the hold frame, the energy storage control circuit controlling the second end of the energy storage circuit to be connected to the first voltage terminal under control of the energy storage control signal.

Optionally, the pixel circuit further includes a second initialization circuit, a data writing circuit and a compensation control circuit; the pixel drive method further includes:

in the initialization phase, the first initialization circuit writing a first initial voltage into the control terminal of the drive circuit under control of the first initialization control signal, so that at the start of the data writing phase, the drive circuit controls a first terminal of the drive circuit to be connected to a second terminal of the drive circuit under control of a potential of the control terminal of the drive circuit;

in the data writing phase, the second initialization circuit writing a second initial voltage into the first electrode of the light-emitting element under control of a second initialization control signal to reset the first electrode of the light-emitting element; and in the data writing phase comprised in the refresh frame, a data line providing a data voltage, and the data writing circuit writing the data voltage into the first terminal of the drive circuit under control of a writing control signal; the compensation control circuit controlling the control terminal of the drive circuit to be connected to the second terminal of the drive circuit under control of a compensation control signal.

Optionally, the energy storage control circuit includes a first control sub-circuit and a second control sub-circuit; the pixel drive method includes:

in the refresh frame, the second control sub-circuit controlling the second end of the energy storage circuit to be connected to the first voltage terminal under control of a connection/disconnection control signal;

in the initialization phase comprised in the hold frame and the data writing phase comprised in the hold frame, the first control sub-circuit controlling the second end of the energy storage circuit to be disconnected from the first voltage terminal under control of the light-emitting control signal; the second control sub-circuit controlling the second end of the energy storage circuit to be disconnected from the first voltage terminal under control of the connection/disconnection control signal; and in the light-emitting phase comprised in the hold frame, the first control sub-circuit controlling the second end of the energy storage circuit to be connected to the first voltage terminal under control of the light-emitting control signal.

In a third aspect, an embodiment of the present disclosure provides a display device including the pixel circuit as described above.

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

Figure 1:
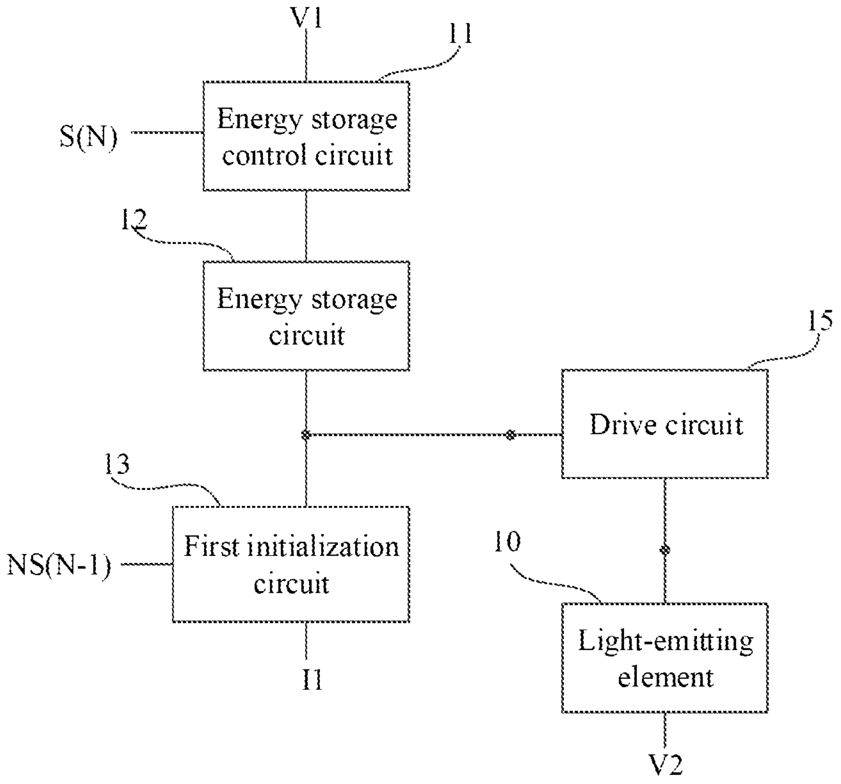
FIG. 1 is a structure diagram of a pixel circuit according to at least one embodiment of the present disclosure.

As shown in FIG. 1, a pixel circuit according to an embodiment of the present disclosure includes an energy storage control circuit 11, an energy storage circuit 12, a first initialization circuit 13, a drive circuit 15, and a light-emitting element 10; wherein a display cycle of the pixel circuit includes a refresh frame and at least one hold frame, and the refresh frame and the hold frame each includes an initialization phase, a data writing phase, and a light-emitting phase;

the first initialization circuit 13 is electrically connected to a first initialization control line NS (N−1), a first initial voltage terminal I1 and a control terminal of the drive circuit 15, and is configured to write a first initial voltage Vi1 provided by the first initial voltage terminal I1 into the control terminal of the drive circuit 15 under control of a first initialization control signal provided by the first initialization control line NS (N−1), so as to reset the control terminal of the drive circuit 15;

a first end of the energy storage circuit 12 is electrically connected to the control terminal of the drive circuit 15, and the energy storage circuit 12 is configured to store electric energy;

the energy storage control circuit 11 is electrically connected to an energy storage control line S(N), a second end of the energy storage circuit 12 and a first voltage terminal V1, and is configured to control the second end of the energy storage circuit 12 to be connected to the first voltage terminal V1 under control of an energy storage control signal provided by the energy storage control line S(N) in the refresh frame, and to control the second end of the energy storage circuit 12 to be disconnected from the first voltage terminal V1 under control of the energy storage control signal in the initialization phase included in the hold frame and the data writing phase included in the hold frame;

the drive circuit 15 is electrically connected to a first electrode of the light-emitting element 10, and the drive circuit 15 is configured to drive the light-emitting element 10 under the control of a potential of the control terminal of the drive circuit;

a second electrode of the light-emitting element 10 is electrically connected to a second voltage terminal V2.

In at least one embodiment of the present disclosure, the first voltage terminal V1 may be a high voltage terminal, the second voltage terminal V2 may be a low voltage terminal, and the light-emitting element 10 may be an OLED (organic light-emitting diode), but this is not limiting.

When the pixel circuit of the embodiment of the present disclosure as shown in FIG. 1 is in operation, a display cycle may include a refresh frame and at least one hold frame; the hold frame and the refresh frame each includes an initialization phase, a data writing phase and a light-emitting phase:

in the refresh frame, the energy storage control circuit 11 controls the second end of the energy storage circuit 12 to be connected to the first voltage terminal V1 under control of the energy storage control signal, and at this moment, the pixel circuit works normally;

in the initialization phase included in the hold frame and the data writing phase included in the hold frame, the energy storage control circuit 11 controls the second end of the energy storage circuit 12 to be disconnected from the first voltage terminal V1 under control of the energy storage control signal, so as to prevent a voltage stored in the energy storage circuit 12 from being rewritten caused by charging and discharging the energy storage circuit 12;

in the initialization phase included in the hold frame, the first initialization circuit 13 writes a first initial voltage Vi1 into the control terminal of the drive circuit 15 under control of the first initialization control signal, so that at the start of the data writing phase, the drive circuit 15 controls the first terminal of the drive circuit 15 to be connected to the second terminal of the drive circuit 15 under control of the potential of the control terminal of the drive circuit;

in the light-emitting phase included in the hold frame, the energy storage control circuit 11 controls the second end of the energy storage circuit 12 to be connected to the first voltage terminal V1 under control of the energy storage control signal.

When the pixel circuit of the embodiment of the present disclosure as shown in FIG. 1 is in operation, in both the refresh frame and the hold frame, the control terminal of the drive circuit 15 is reset, so as to reduce the brightness difference between the refresh frame and the hold frame and improve the flicker phenomenon in low frequency display or variable frequency driving. The pixel circuit according to the embodiment of the present disclosure can realize low-frequency driving and reduce IC (integrated circuit) power consumption.

In the related art, in order to reduce power consumption, the LTPO (low temperature poly-oxide) technology is more and more widely used. In the case of the related display device using the LTPO pixel circuit to reduce the leakage current, the flicker phenomenon is visually observed in low frequency display and variable frequency driving. On this basis, according to the embodiments of the present disclosure, in both the refresh frame and the hold frame, the control terminal of the drive circuit 15 is reset, so as to improve the flicker phenomenon in low frequency display or variable frequency driving.

Figure 2:
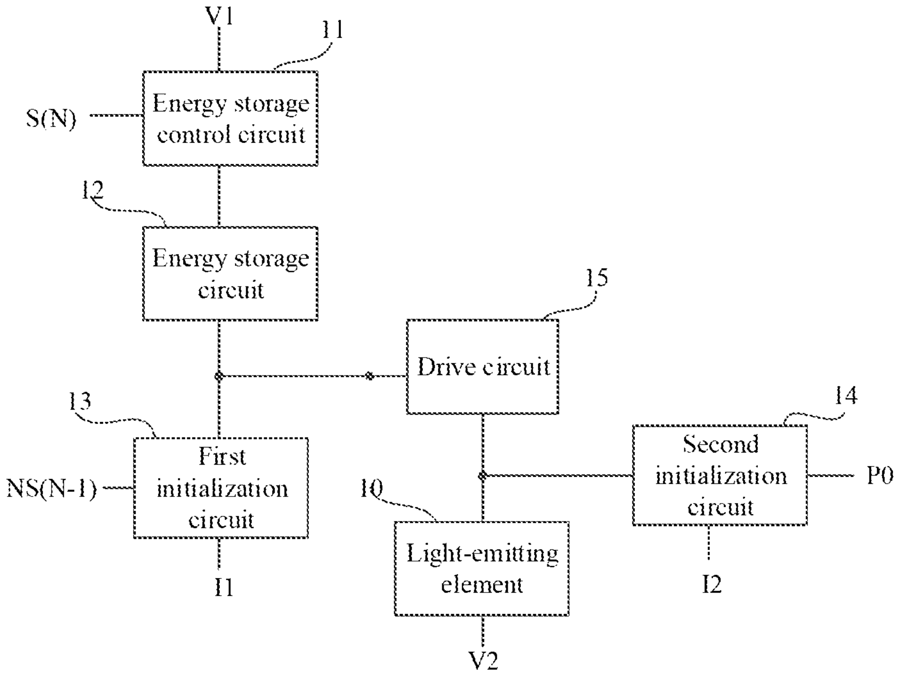
FIG. 2 is a structure diagram of a pixel circuit according to at least one embodiment of the present disclosure.

As shown in FIG. 2, on the basis of the embodiment of the pixel circuit shown in FIG. 1, in at least one embodiment of the present disclosure, the pixel circuit further includes a second initialization circuit 14. The second initialization circuit 14 is electrically connected to a second initialization control line P0, a second initial voltage terminal I2 and the first electrode of the light-emitting element 10, and is configured to write a second initial voltage Vi2 provided by the second initial voltage terminal I2 into the first electrode of the light-emitting element 10 under control of a second initialization control signal provided by the second initialization control line P0.

When the pixel circuit of at least one embodiment of the present disclosure as shown in FIG. 2 is in operation, in the data writing phase included in the hold frame, the second initialization circuit 14 writes the second initial voltage Vi2 into the first electrode of the light-emitting element 10 under control of the second initialization control signal to reset the first electrode of the light-emitting element 10.

When the pixel circuit of at least one embodiment of the present disclosure as shown in FIG. 2 is in operation, in both the refresh frame and the hold frame, the first electrode of the light-emitting element 10 is reset, so as to reduce the brightness difference between the refresh frame and the hold frame and improve the flicker phenomenon in low frequency display or variable frequency driving.

In at least one embodiment of the present disclosure, the second initialization circuit 14 writes the second initial voltage Vi2 into the first electrode of the light-emitting element 10 under control of the second initialization control signal, to reset the first electrode of the light-emitting element 10, and controls the light-emitting element 10 not to emit light, but this is not limiting.

Figure 3:
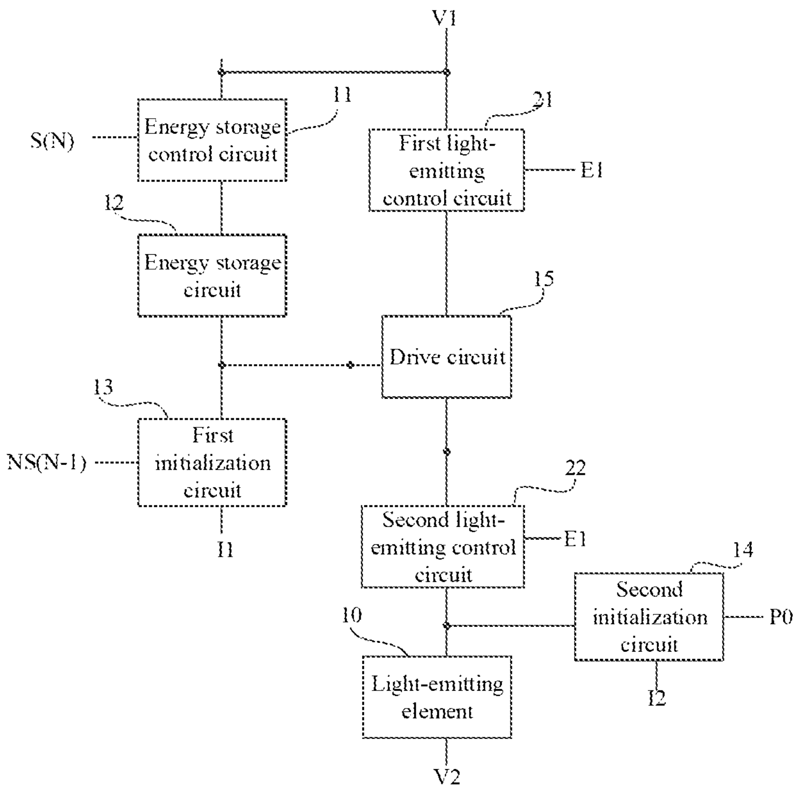
FIG. 3 is a structure diagram of a pixel circuit according to at least one embodiment of the present disclosure.

As shown in FIG. 3, on the basis of the embodiment of the pixel circuit shown in FIG. 2, in at least one embodiment of the present disclosure, the pixel circuit further includes a first light-emitting control circuit 21 and a second light-emitting control circuit 22. The second terminal of the drive circuit 15 is electrically connected to the first electrode of the light-emitting element 10 through the second light-emitting control circuit 22:

the first light-emitting control circuit 21 is electrically connected to a light-emitting control line E1, the first voltage terminal V1 and the first terminal of the drive circuit 15, and is configured to control the first voltage terminal V1 to be connected to or disconnected from the first terminal of the drive circuit 15 under control of a light-emitting control signal provided by the light-emitting control line E1:

the second light-emitting control circuit 22 is electrically connected to the light-emitting control line E1, the second terminal of the drive circuit 15 and the first electrode of the light-emitting element 10, and is configured to control the second terminal of the drive circuit 15 to be connected to or disconnected from the first electrode of the light-emitting element 10 under control of the light-emitting control signal.

When the pixel circuit of at least one embodiment of the present disclosure as shown in FIG. 3 is in operation, in the light-emitting phase, the first light-emitting control circuit 21 controls the first voltage terminal V1 to be connected to the first terminal of the drive circuit 15 under the control of a light-emitting control signal, and the second light-emitting control circuit 22 controls the second terminal of the drive circuit 15 to be connected to the first electrode of the light-emitting element 10 under control of the light-emitting control signal.

Figure 4:
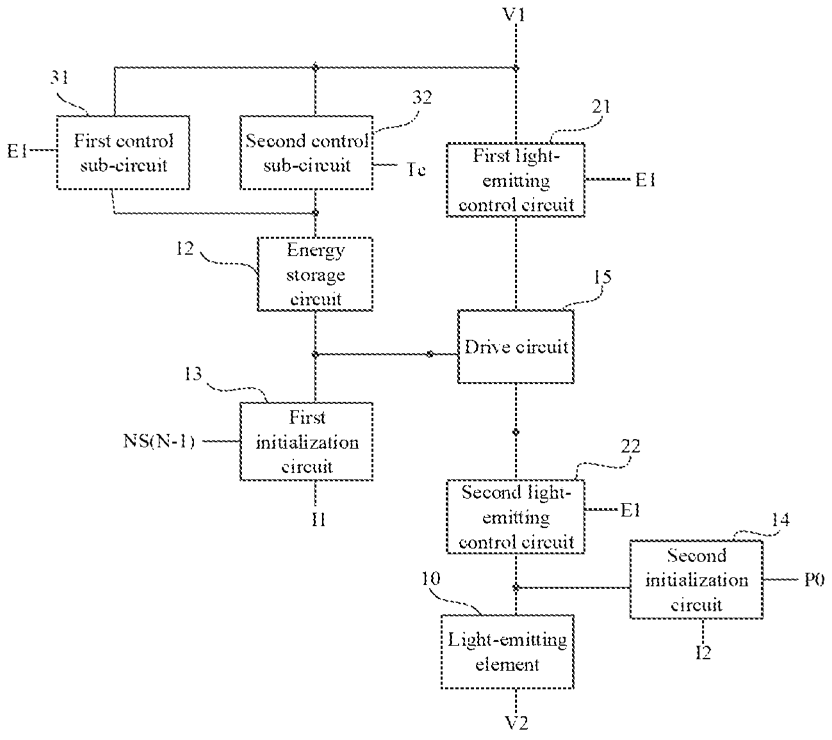
FIG. 4 is a structure diagram of a pixel circuit according to at least one embodiment of the present disclosure.

In at least one embodiment of the present disclosure, as shown in FIG. 4, on the basis of at least one embodiment of the pixel circuit shown in FIG. 3, the energy storage control line includes the light-emitting control line E1 and a connection/disconnection control line Tc; the energy storage control circuit includes a first control sub-circuit 31 and a second control sub-circuit 32:

the second control sub-circuit 32 is electrically connected to the connection/disconnection control line Tc, the first voltage terminal V1 and the second end of the energy storage circuit 12, and is configured to control the first voltage terminal V1 to be connected to or disconnected from the second end of the energy storage circuit 12 under control of a connection/disconnection control signal provided by the connection/disconnection control line Tc;

the first control sub-circuit 31 is electrically connected to the light-emitting control line E1, the first voltage terminal V1 and the second end of the energy storage circuit 12, and is configured to control the first voltage terminal V1 to be connected to or disconnected from the second end of the energy storage circuit 12 under control of the light-emitting control signal in response to control of the second control sub-circuit 32. When the pixel circuit of at least one embodiment of the present disclosure as shown in FIG. 4 is in operation, a display cycle may include a refresh frame and at least one hold frame; the refresh frame and hold frame each includes an initialization phase, a data writing phase and a light-emitting phase;

in the refresh frame, the second control sub-circuit 32 controls the first voltage terminal V1 to be connected to the second end of the energy storage circuit 12 under control of a connection/disconnection control signal, and at this moment, the pixel circuit works normally;

in the initialization phase included in the hold frame and the data writing phase included in the hold frame, the second control sub-circuit 32 controls the first voltage terminal V1 to be disconnected from the second end of the energy storage circuit 12 under control of the connection/disconnection control signal, and the first control sub-circuit 31 controls the first voltage terminal V1 to be disconnected from the second end of the energy storage circuit 12 under control of the light-emitting control signal, so as to prevent a voltage stored in the energy storage circuit 12 from being rewritten caused by charging and discharging the energy storage circuit 12;

in the initialization phase included in the hold frame, the first initialization circuit 13 writes a first initial voltage Vi1 into the control terminal of the drive circuit 15 under control of the first initialization control signal, so that at the start of the data writing phase, the drive circuit 15 controls the first terminal of the drive circuit 15 to be connected to the second terminal of the drive circuit 15 under control of the potential of the control terminal of the drive circuit;

in the data writing phase included in the hold frame, the second initialization circuit 14 writes the second initial voltage Vi2 into the first electrode of the light-emitting element 10 under control of the second initialization control signal to reset the light-emitting element 10;

the light-emitting phase included in the hold frame, the first control sub-circuit 31 controls the first voltage terminal V1 to be connected to the second end of the energy storage circuit 12 under control of the light-emitting control signal.

When the pixel circuit of at least one embodiment of the present disclosure as shown in FIG. 4 is in operation, the first control sub-circuit 31 controls the first voltage terminal V1 to be connected to or disconnected from the second end of the energy storage circuit 12 under control of the light-emitting control signal in response to control of the second control sub-circuit 32:

specifically, only when the second control sub-circuit 32 controls the first voltage terminal V1 to be disconnected from the second end of the energy storage circuit 12 under control of the connection/disconnection control signal, the first control sub-circuit 31 can control the first voltage terminal V1 to be connected or disconnected from the second end of the energy storage circuit 12 under control of the light-emitting control signal;

when the second control sub-circuit 32 controls the first voltage terminal V1 to be connected to the second end of the energy storage circuit 12, the first control sub-circuit 31 cannot control the connection or disconnection between the first voltage terminal V1 and the second end of the energy storage circuit 12.

Optionally, the energy storage control circuit includes a first transistor; a control electrode of the first transistor is electrically connected to the energy storage control line, a first electrode of the first transistor is electrically connected to the first voltage terminal, and a second electrode of the first transistor is electrically connected to the second end of the energy storage circuit.

Optionally, the first control sub-circuit includes a first transistor, and the second sub-control circuit includes a second transistor;

a control electrode of the first transistor is electrically connected to the light-emitting control line, a first electrode of the first transistor is electrically connected to the first voltage terminal, and a second electrode of the first transistor is electrically connected to the second end of the energy storage circuit;

a control electrode of the second transistor is electrically connected to the connection/disconnection control line, a first electrode of the second transistor is electrically connected to the first voltage terminal, and a second electrode of the second transistor is electrically connected to the second end of the energy storage circuit.

In at least one embodiment of the present disclosure, the pixel circuit further includes a data writing circuit and a compensation control circuit:

the data writing circuit is electrically connected to a writing control line, a data line and the first terminal of the drive circuit, and is configured to write a data voltage provided by the data line into the first terminal of the drive circuit under control of a writing control signal provided by the writing control line, so as to perform data voltage writing;

the compensation control circuit is electrically connected to a compensation control line, the control terminal of the drive circuit and the second terminal of the drive circuit, and is configured to control the control terminal of the drive circuit to be connected to or disconnected from the second terminal of the drive circuit under control of a compensation control signal provided by the compensation control line, so as to perform threshold voltage compensation.

Figure 5:
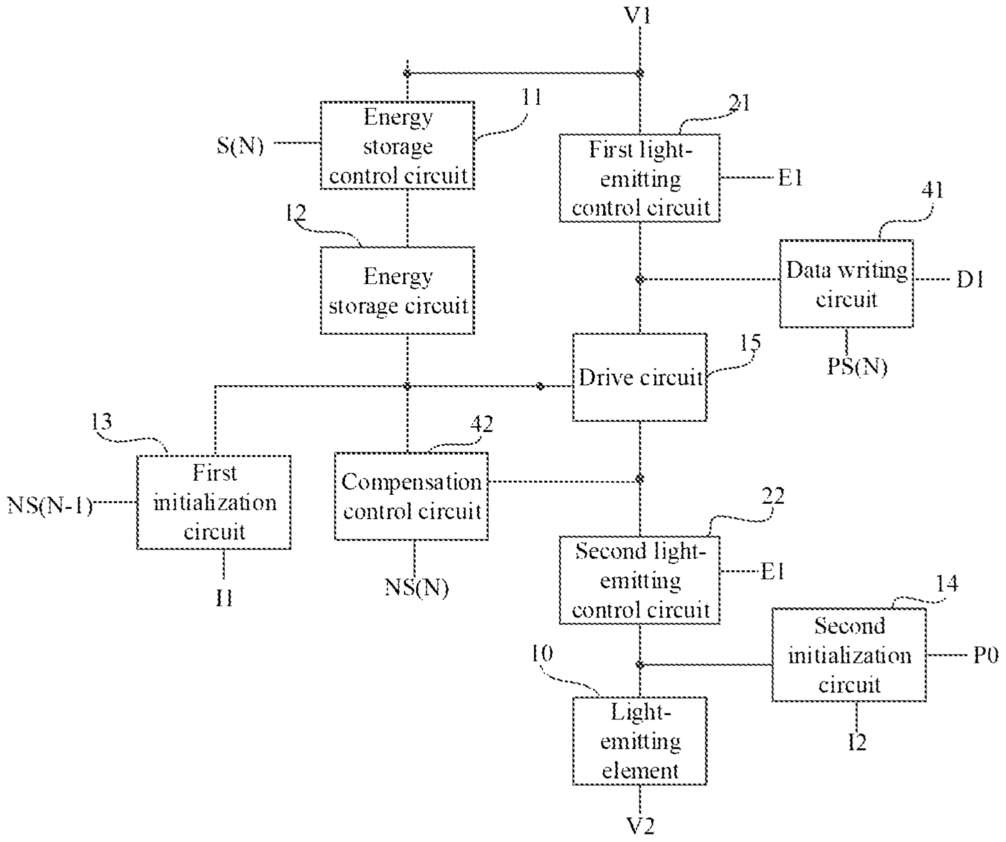
FIG. 5 is a structure diagram of a pixel circuit according to at least one embodiment of the present disclosure.

As shown in FIG. 5, on the basis of at least one embodiment of the pixel circuit shown in FIG. 3, in at least one embodiment of the present disclosure, the pixel circuit further includes a data writing circuit 41 and a compensation control circuit 42:

the data writing circuit 41 is electrically connected to a writing control line PS(N), a data line D1 and the first terminal of the drive circuit 15, and is configured to write a data voltage Vdata provided by the data line D1 into the first terminal of the drive circuit 15 under control of a writing control signal provided by the writing control line PS(N), so as to perform data voltage writing;

the compensation control circuit 42 is electrically connected to a compensation control line NS(N), the control terminal of the drive circuit 15 and the second terminal of the drive circuit 15, and is configured to control the control terminal of the drive circuit 15 to be connected to or disconnected from the second terminal of the drive circuit 15 under control of a compensation control signal provided by the compensation control line NS(N), so as to perform threshold voltage compensation.

When the pixel circuit of at least one embodiment of the present disclosure as shown in FIG. 5 is in operation, in the data writing phase included in the refresh frame, the data line D1 provides a data voltage, and the data writing circuit 41 writes the data voltage Vdata into the first terminal of the drive circuit under control of a writing control signal; the compensation control circuit 42 controls the control terminal of the drive circuit 15 to be connected to the second terminal of the drive circuit 15 under control of a compensation control signal.

Figure 6:
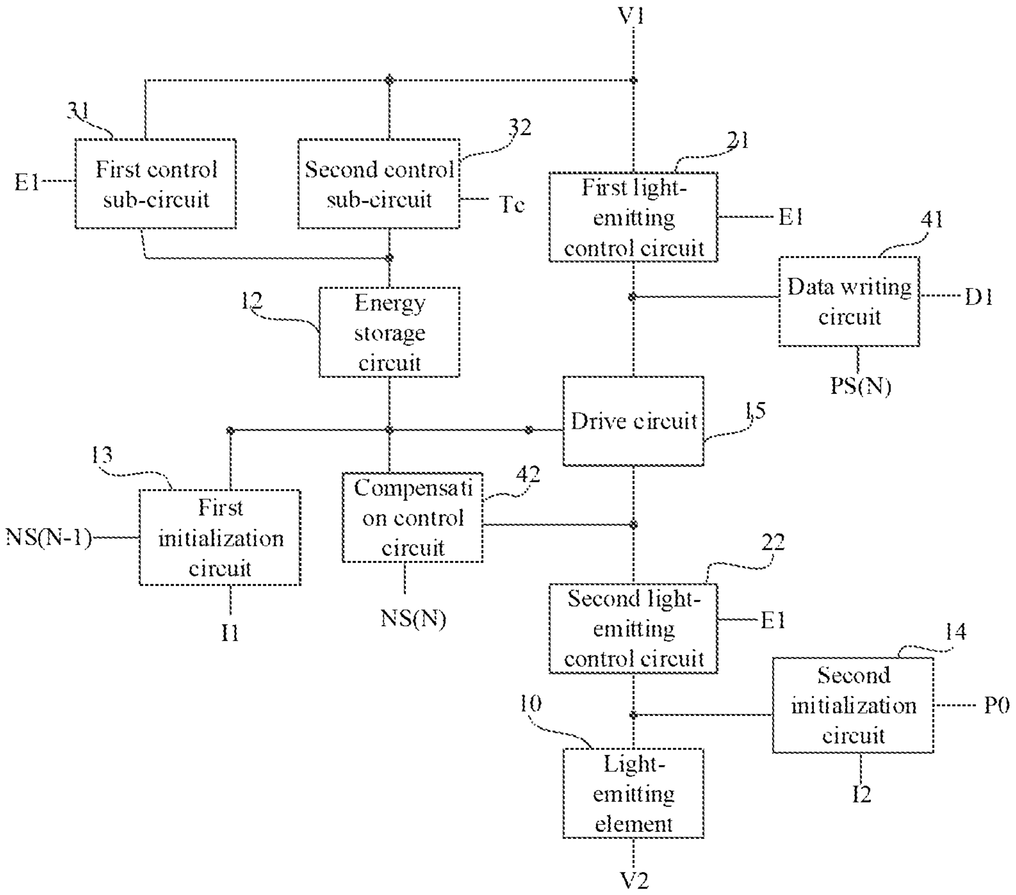
FIG. 6 is a circuit diagram of a pixel circuit according to at least one embodiment of the present disclosure.

As shown in FIG. 6, on the basis of the pixel circuit of at least one embodiment shown in FIG. 4, according to at least one embodiment of the present disclosure, the pixel circuit further includes a data writing circuit 41 and a compensation control circuit 42;

the data writing circuit 41 is electrically connected to a writing control line PS(N), a data line D1 and the first terminal of the drive circuit 15, and is configured to write a data voltage Vdata provided by the data line D1 into the first terminal of the drive circuit 15 under control of a writing control signal provided by the writing control line PS(N), so as to perform data voltage writing;

the compensation control circuit 42 is electrically connected to a compensation control line NS(N), the control terminal of the drive circuit 15 and the second terminal of the drive circuit 15, and is configured to control the control terminal of the drive circuit 15 to be connected to or disconnected from the second terminal of the drive circuit 15 under control of a compensation control signal provided by the compensation control line NS(N), so as to perform threshold voltage compensation.

When the pixel circuit of at least one embodiment of the present disclosure as shown in FIG. 5 is in operation, in the data writing phase included in the refresh frame, the data line D1 provides a data voltage, and the data writing circuit 41 writes the data voltage Vdata into the first terminal of the drive circuit under control of a writing control signal; the compensation control circuit 42 controls the control terminal of the drive circuit 15 to be connected to the second terminal of the drive circuit 15 under control of a compensation control signal.

Optionally, the transistor included in the second initialization circuit and the transistor included in the data writing circuit are both p-type transistors, or the transistor included in the second initialization circuit and the transistor included in the data writing circuit are both n-type transistors; the writing control line and the second initialization control line may provide a same control signal.

Optionally, the first initialization circuit includes a third transistor, and the second initialization circuit includes a fourth transistor;

- a control electrode of the third transistor is electrically connected to the first initialization control line, a first electrode of the third transistor is electrically connected to the first initial voltage terminal, and a second electrode of the third transistor is electrically connected to the control terminal of the drive circuit;
- a control electrode of the fourth transistor is electrically connected to the second initialization control line, a first electrode of the fourth transistor is electrically connected to the second initial voltage terminal, and a second electrode of the fourth transistor is electrically connected to the first electrode of the light-emitting element.

Optionally, the first light-emitting control circuit includes a fifth transistor, the second light-emitting control circuit includes a sixth transistor, and the energy storage circuit includes a storage capacitor:

- a control electrode of the fifth transistor is electrically connected to the light-emitting control line, a first electrode of the fifth transistor is electrically connected to the first voltage terminal, and a second electrode of the fifth transistor is electrically connected to the first terminal of the drive circuit;
- a control electrode of the sixth transistor is electrically connected to the light-emitting control line, a first electrode of the sixth transistor is electrically connected to the second terminal of the drive circuit, and a second electrode of the sixth transistor is electrically connected to the first electrode of the light-emitting element;
- a first terminal of the storage capacitor is electrically connected to the control terminal of the drive circuit, and a second terminal of the storage capacitor is the second end of the energy storage circuit.

Figure 7:
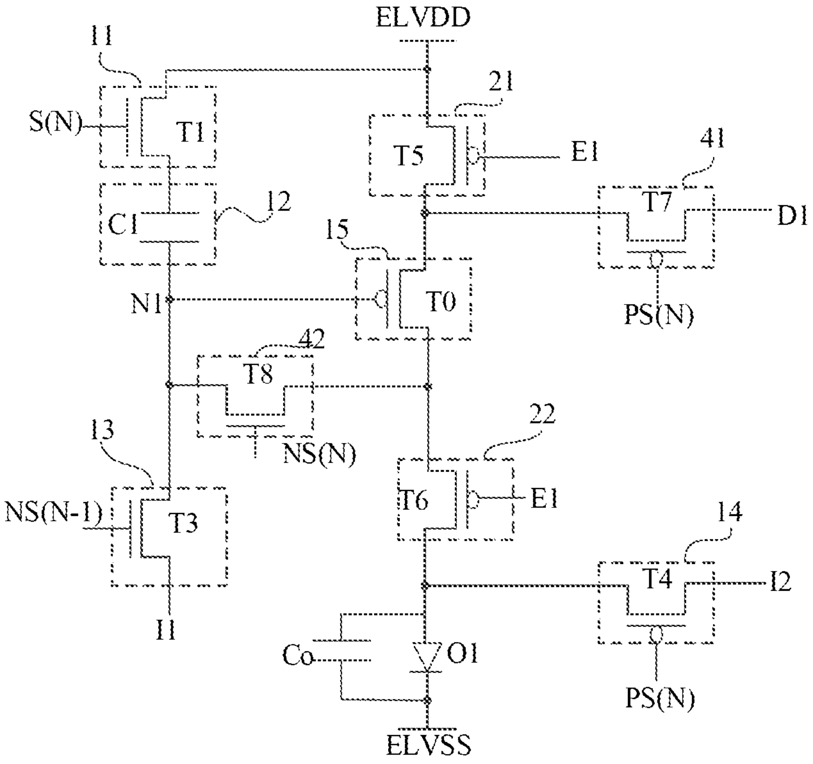
FIG. 7 is a circuit diagram of a pixel circuit according to at least one embodiment of the present disclosure.

Optionally, the data writing circuit includes a seventh transistor, and the compensation control circuit includes an eighth transistor;

- a control electrode of the seventh transistor is electrically connected to the writing control line, a first electrode of the seventh transistor is electrically connected to the data line, and a second electrode of the seventh transistor is electrically connected to the first terminal of the drive circuit;
- a control electrode of the eighth transistor is electrically connected to the compensation control line, a first electrode of the eighth transistor is electrically connected to the control terminal of the drive circuit, and a second electrode of the eighth transistor is electrically connected to the second terminal of the drive circuit;

As shown in FIG. 7, on the basis of at least one embodiment of the pixel circuit shown in FIG. 5, the energy storage control circuit 11 includes a first transistor T1, the first initialization circuit 13 includes a third transistor T3, and the second initialization circuit 14 includes a fourth transistor T4; the energy storage circuit 12 includes a storage capacitor C1: the drive circuit 15 includes a drive transistor T0; the light-emitting element is an organic light-emitting diode O1;

- a gate electrode of the first transistor T1 is electrically connected to the energy storage control line S(N), a source electrode of the first transistor T1 is electrically connected to a high voltage terminal ELVDD, and a drain electrode of the first transistor T1 is electrically connected to a second terminal of the storage capacitor C1; a first terminal of the storage capacitor C1 is electrically connected to a gate electrode of the drive transistor T0;
- a gate electrode of the third transistor T3 is electrically connected to the first initialization control line NS (N−1), a source electrode of the third transistor T3 is electrically connected to the first initial voltage terminal I1, and a drain electrode of the third transistor T3 is electrically connected to the gate electrode of the drive transistor T0;
- a gate electrode of the fourth transistor T4 is electrically connected to the writing control line PS(N), a source electrode of the fourth transistor T4 is electrically connected to the second initial voltage terminal 12, and a drain electrode of the fourth transistor T4 is electrically connected to an anode of the organic light-emitting diode O1;

the first light-emitting control circuit 21 includes a fifth transistor T5, and the second light-emitting control circuit 22 includes a sixth transistor T6;

a gate electrode of the fifth transistor T5 is electrically connected to the light-emitting control line E1, a source electrode of the fifth transistor T5 is electrically connected to the high voltage terminal ELVDD, and a drain electrode of the fifth transistor T5 is electrically connected to the source electrode of the drive transistor T0;

a gate electrode of the sixth transistor T6 is electrically connected to the light-emitting control line E1, a source electrode of the sixth transistor T6 is electrically connected to the drain electrode of the drive transistor T0, and a drain electrode of the sixth transistor T6 is electrically connected to the anode of the organic light-emitting diode O1;

the data writing circuit 41 includes a seventh transistor T7, and the compensation control circuit 42 includes an eighth transistor T8;

a gate electrode of the seventh transistor T7 is electrically connected to the writing control line PS(N), a source electrode of the seventh transistor T7 is electrically connected to the data line D1, and a drain electrode of the seventh transistor T7 is electrically connected to the source electrode of the drive transistor T0;

a gate electrode of the eighth transistor T8 is electrically connected to the compensation control line NS(N), a source electrode of the eighth transistor T8 is electrically connected to the gate electrode of the drive transistor T0, and a drain electrode of the eighth transistor T8 is electrically connected to the drain electrode of the drive transistor T0;

a cathode of the organic light-emitting diode O1 is electrically connected to the low voltage terminal ELVSS.

In at least one embodiment of the pixel circuit shown in FIG. 7, T1, T3, and T8 are all n-type thin film transistors, and T0, T4, T5, T6, and T7 are all p-type thin film transistors.

In FIG. 7, the parasitic capacitance between the anode of O1 and the cathode of O1, labeled Co, and the first node N1 is electrically connected to the gate electrode of T0.

Figure 8:
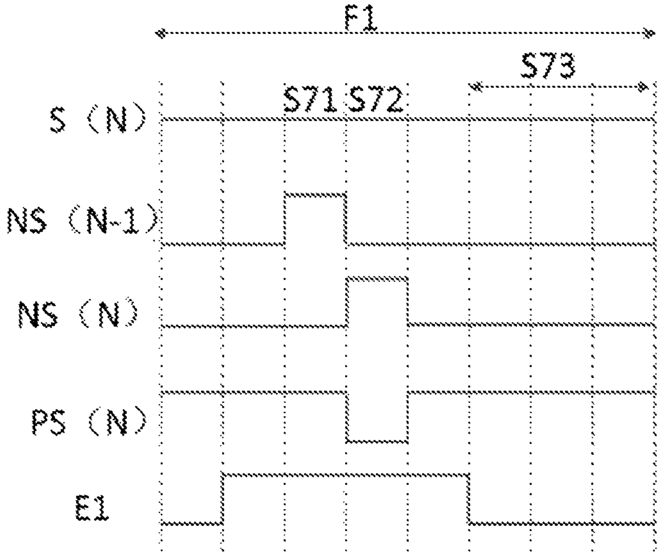
FIG. 8 is an operational timing diagram of the pixel circuit as shown in FIG. 7 in a refresh frame according to at least one embodiment of the present disclosure.

As shown in FIG. 8, in the refresh frame F1, when the pixel circuit of at least one embodiment shown in FIG. 7 is in operation, S(N) provides a high voltage signal and T1 is turned on, then the pixel circuit of at least one embodiment shown in FIG. 7 corresponds to a conventional LTPO (low temperature poly-oxide) 7T1C pixel circuit.

As shown in FIG. 8, when the pixel circuit of at least one embodiment of the present disclosure as shown in FIG. 7 is in operation.

in an initialization phase S71 included in the refresh frame F1, NS (N−1) provides a high voltage signal, NS(N) provides a low voltage signal, PS(N) provides a high voltage signal, E1 provides a high voltage signal, I1 provides a first initial voltage Vi1, T3 is turned on, and T4 is turned off, so that Vi1 is written into the gate electrode of T0, and T0 can be turned on at the start of a data writing phase S72 included in the refresh frame; T8 is turned off, T7 is turned off, and T5 and T6 are turned off;

in the data writing phase S72 included in the refresh frame F1, NS (N−1) provides a low voltage signal. NS(N) provides a high voltage signal, PS(N) provides a low voltage signal, E1 provides a high voltage signal, T3 is turned off. T4 is turned on, and I2 provides a second initial voltage Vi2, so that Vi2 is written into the anode of O1 and the anode of O1 is reset; the data line D1 provides a data voltage Vdata; T7 and T8 are turned on; T5 and T6 are turned off;

at the start of the data writing phase S72 included in the refresh frame F1, T0 is turned on to charge C1 via the Vdata so as to change the potential of the first node N1 until the potential of the gate electrode of T0 becomes Vdata+Vth, and T0 is turned off, wherein Vth is the threshold voltage of T0;

in the light-emitting phase S73 included in the refresh frame F1, NS (N−1) and NS(N) both provide a low voltage signal, PS(N) provides a high voltage signal. E1 provides a low voltage signal, T3, T4, T7 and T8 are turned off, T5 and T6 are turned on, and T0 drives O1 to emit light.

Figure 9:
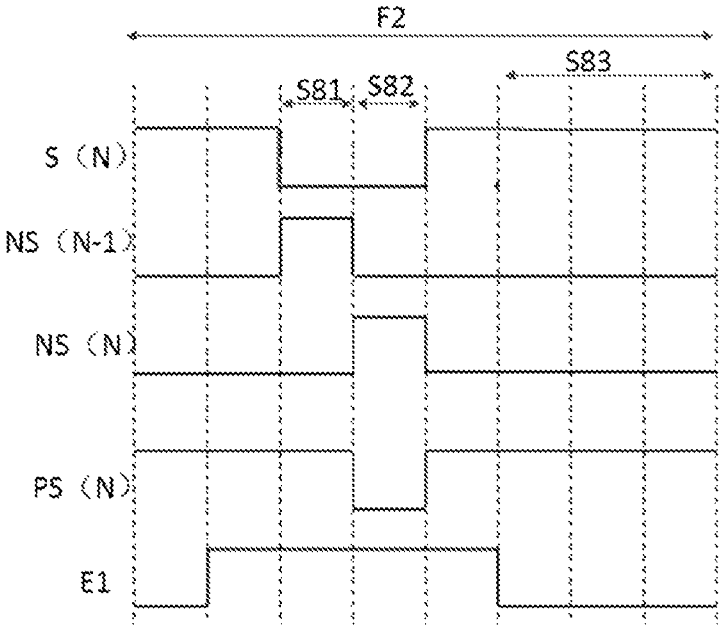
FIG. 9 is an operational timing diagram of the pixel circuit as shown in FIG. 7 in a refresh frame according to at least one embodiment of the present disclosure.

As shown in FIG. 9, when the pixel circuit of at least one embodiment of the present disclosure as shown in FIG. 7 is in operation, in an initialization phase S81 included in the hold frame F2, S(N) provides a low voltage signal, NS (N−1) provides a high voltage signal, NS(N) provides a low voltage signal, PS(N) provides a high voltage signal, E1 provides a high voltage signal, T1 is turned off I1 provides a first initial voltage Vi1, and T3 is turned on, so that Vi1 is written in to a first node N1, so that when at the starts the data writing phase S82 included in the hold frame, T0 may be turned on; T4 is turned off; T8 is turned of T7 is turned off, and T5 and T6 are turned off;

in the data writing phase S82 included in the hold frame F2, S(N) provides a low voltage signal, NS (N−1) provides a low voltage signal, NS(N) provides a high voltage signal, PS(N) provides a low voltage signal, E1 provides a high voltage signal, I2 provides a second initial voltage Vi2, T1 is turned off, T3 is turned off, and T4 is turned on, so that Vi2 is written into the anode of O1, and the anode of O1 is reset; T7 is turned on; T8 is turned on; T5 and T6 are turned off; in a light-emitting phase S83 included in the hold frame F2, S(N) provides a high voltage signal. NS (N−1) provides a low voltage signal, NS(N) provides a low voltage signal, PS(N) provides a high voltage signal, E1 provides a low voltage signal, T3. T4, T7 and T8 are turned off, T5 and T6 are turned on, and O1 maintains a light-emitting state.

When the pixel circuit of at least one embodiment of the present disclosure as shown in FIG. 7 is in operation, in both the refresh frame and the hold frame, the gate electrode of T0 and the anode of O1 are reset, thereby reducing the brightness difference caused by the different resetting of the parasitic capacitance Co of O1 due to the refresh frame and the hold frame, which is opposite to the threshold voltage shift process of T0.

Figure 10:
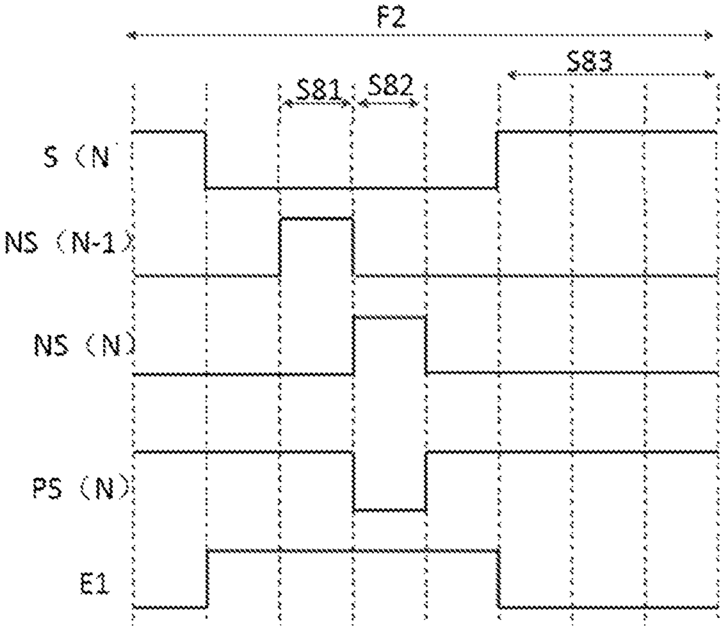
FIG. 10 is an operational timing diagram of the pixel circuit as shown in FIG. 7 in a refresh frame according to at least one embodiment of the present disclosure.

As shown in FIG. 10, when the pixel circuit of at least one embodiment of the present disclosure as shown in FIG. 7 is in operation, in the hold frame, the energy storage control signal provided by S(N) may be inverted from the light-emitting control signal provided by E1 and have the same bandwidth.

In at least one embodiment of the present disclosure, when the pixel circuit of at least one embodiment of the present disclosure as shown in FIG. 7 is in operation, when E1 provides a low voltage signal, S(N) needs to provide a high voltage signal for the following reasons:

if in the light-emitting phase, when T0 drives O1 to emits light. T1 is turned off, then the first node N1 floats and the potential of the first node N1 is uncertain, which may affect the display, so that T1 needs to be turned on when O1 emits light.

At least one embodiment of the pixel circuit of the present disclosure as shown in 11 differs from at least one embodiment of the pixel drive circuit of the present disclosure as shown in FIG. 7 in that; T1 is a p-type thin film transistor.

Figure 11:
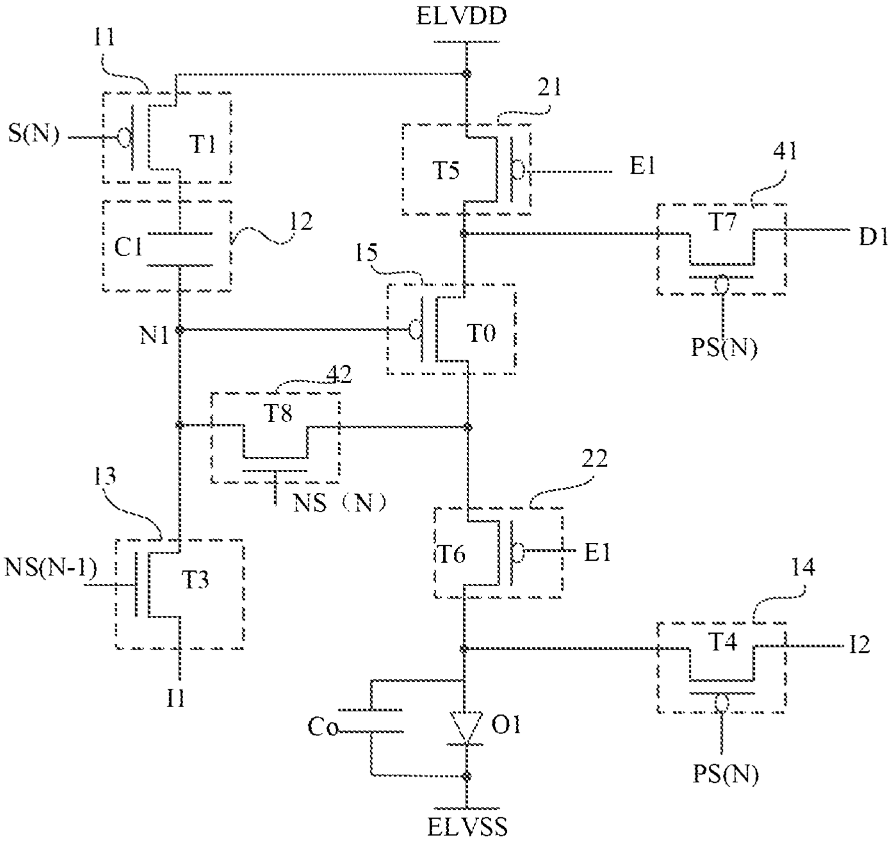
FIG. 11 is a circuit diagram of a pixel circuit according to at least one embodiment of the present disclosure.
Figure 12:
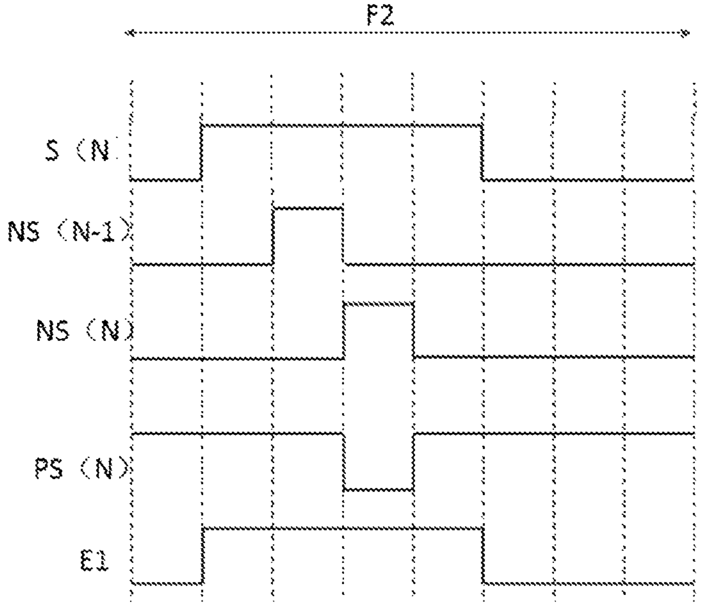
FIG. 12 is an operational timing diagram of the pixel circuit as shown in FIG. 11 in a hold frame according to at least one embodiment of the present disclosure.

FIG. 12 is an operational timing diagram of the pixel circuit as shown in FIG. 11 in a hold frame according to at least one embodiment of the present disclosure.

Figure 13:
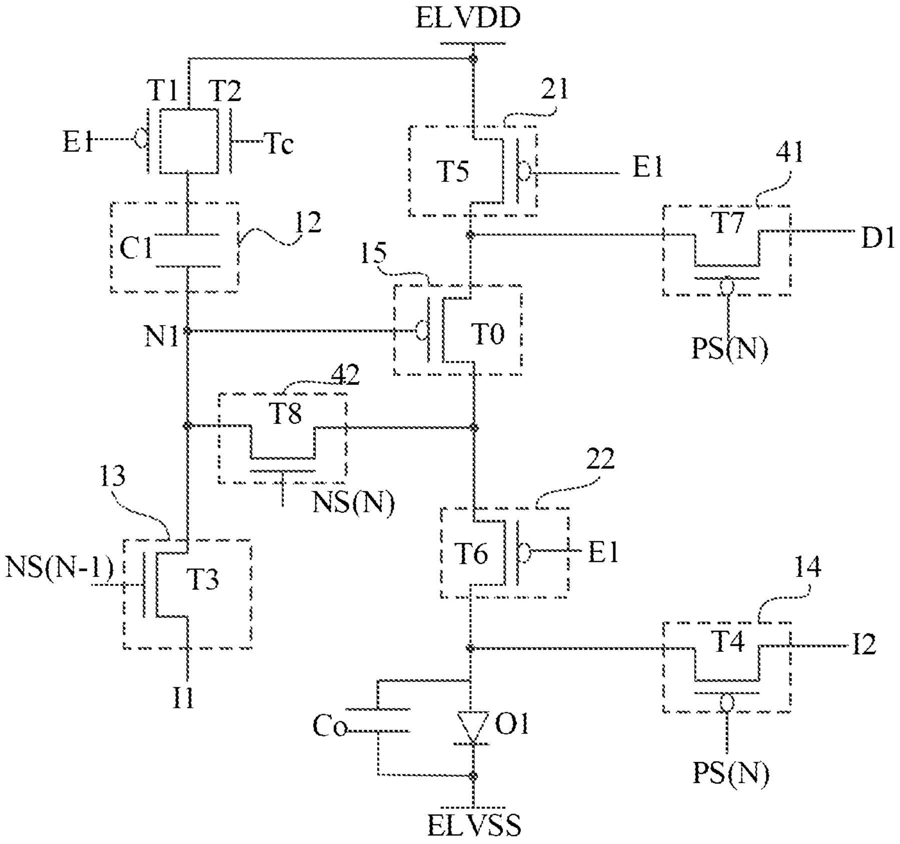
FIG. 13 is a circuit diagram of a pixel circuit according to at least one embodiment of the present disclosure.

As shown in FIG. 13, on the basis of at least one embodiment of the pixel circuit shown in FIG. 6, the first control sub-circuit includes a first transistor T1 and the second control sub-circuit includes a second transistor T2; the first initialization circuit 13 includes a third transistor T3, and the second initialization circuit includes a fourth transistor T4; the energy storage circuit 12 includes a storage capacitor C1; the drive circuit 15 includes a drive transistor T0; the light-emitting element is an organic light-emitting diode O1;

a gate electrode of the first transistor T1 is electrically connected to the light-emitting control line E1, a source electrode of the first transistor T1 is electrically connected to the high voltage terminal ELVDD, and a drain electrode of the first transistor T1 is electrically connected to a second terminal of the storage capacitor C1;

a gate electrode of the second transistor T2 is electrically connected to the connection/disconnection control line Tc, a source electrode of the second transistor T2 is electrically connected to the high voltage terminal ELVDD, and a drain electrode of the second transistor T2 is electrically connected to the second terminal of the storage capacitor C1;

a gate electrode of the third transistor T3 is electrically connected to the first initialization control line NS (N−1), a source electrode of the third transistor T3 is electrically connected to the first initial voltage terminal I1, and a drain electrode of the third transistor T3 is electrically connected to the gate electrode of the drive transistor T0;

a gate electrode of the fourth transistor T4 is electrically connected to the writing control line PS(N), a source electrode of the fourth transistor T4 is electrically connected to the second initial voltage terminal I2, and a drain electrode of the fourth transistor T4 is electrically connected to an anode of the organic light-emitting diode O1;

the first light-emitting control circuit 21 includes a fifth transistor T5, and the second light-emitting control circuit 22 includes a sixth transistor T6;

a gate electrode of the fifth transistor T5 is electrically connected to the light-emitting control line E1, a source electrode of the fifth transistor T5 is electrically connected to the high voltage terminal ELVDD, and a drain electrode of the fifth transistor T5 is electrically connected to the source electrode of the drive transistor T0;

a gate electrode of the sixth transistor T6 is electrically connected to the light-emitting control line E1, a source electrode of the sixth transistor T6 is electrically connected to the drain electrode of the drive transistor T0, and a drain electrode of the sixth transistor T6 is electrically connected to the anode of the organic light-emitting diode O1;

the data writing circuit 41 includes a seventh transistor T7, and the compensation control circuit 42 includes an eighth transistor T8;

a gate electrode of the seventh transistor T7 is electrically connected to the writing control line PS(N), a source electrode of the seventh transistor T7 is electrically connected to the data line D1, and a drain electrode of the seventh transistor T7 is electrically connected to the source electrode of the drive transistor T0;

a gate electrode of the eighth transistor T8 is electrically connected to the compensation control line NS(N), a source electrode of the eighth transistor T8 is electrically connected to the gate electrode of the drive transistor T0, and a drain electrode of the eighth transistor T8 is electrically connected to the drain electrode of the drive transistor T0;

a cathode of the organic light-emitting diode O1 is electrically connected to the low voltage terminal ELVSS.

In at least one embodiment of the pixel circuit shown in FIG. 13, T2. T3, and T8 are all n-type thin film transistors, and T0, T1, T4, T5, T6, and T7 are all p-type thin film transistors.

In FIG. 13, the parasitic capacitance between the anode of O1 and the cathode of O1, labeled as Co, and the first node N1 is electrically connected to the gate electrode of T0.

In FIG. 13, the first node is labeled as N1.

Figure 14:
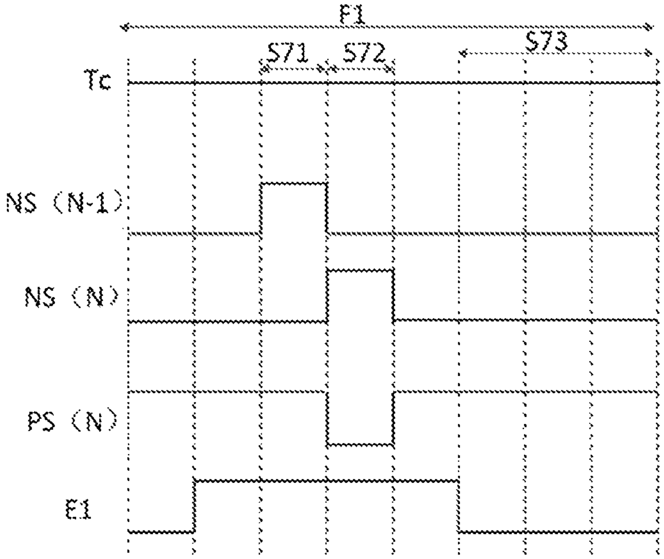
FIG. 14 is an operational timing diagram of the pixel circuit as shown in FIG. 13 in a refresh frame according to at least one embodiment of the present disclosure.

As shown in FIG. 14, Tc provides a high voltage signal, and T2 is turned on, then the pixel circuit of at least one embodiment shown in FIG. 13 corresponds to a conventional LTPO 7T1C pixel circuit in the refresh frame.

As shown in FIG. 14, when the pixel circuit of at least one embodiment of the present disclosure as shown in FIG. 13 is in operation, in an initialization phase S71 included in the refresh frame F1, NS (N−1) provides a high voltage signal, NS(N) provides a low voltage signal, PS(N) provides a high voltage signal, E1 provides a high voltage signal, I1 provides a first initial voltage Vi1, T3 is tinned on, and T4 is turned off, so that Vi1 is written into the gate electrode of T0, and T0 can be turned on at the start of a data writing phase S72 included in the refresh frame; T8 is turned off T7 is turned off, and T5 and T6 is turned off; T1 is turned off;

in the data writing phase S72 included in the refresh frame F1, NS (N−1) provides a low voltage signal. NS(N) provides a high voltage signal, PS(N) provides a low voltage signal, E1 provides a high voltage signal, T3 is turned off, T4 is turned on, and I2 provides a second initial voltage Vi2, so that Vi2 is written into the anode of O1 and the anode of O1 is reset; the data line D1 provides a data voltage Vdata; T7 and T8 are turned on; T5 and T6 are turned off; T1 is turned, off;

at the start of the data writing phase S72 included in the refresh frame F1, T0 is turned on to charge C1 via the Vdata so as to change the potential of the first node N1 until the potential of the gate electrode of T0 becomes Vdata+Vth, and T0 is turned off, wherein Vth is the threshold voltage of T0;

in the light-emitting phase S73 included in the refresh frame F1, NS (N−1) and NS(N) both provide a low voltage signal, PS(N) provides a high voltage signal, E1 provides a low voltage signal, T3, T4, T7 and T8 are turned off, T1, T5 and T6 are turned on, and T0 drives O1 to emit light.

Figure 15:
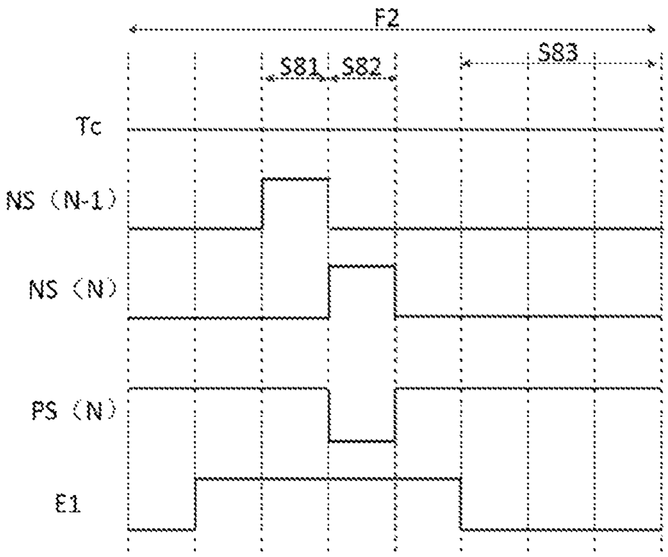
FIG. 15 is an operational timing diagram of the pixel circuit as shown in FIG. 13 in a hold frame according to at least one embodiment of the present disclosure.

As shown in FIG. 15, when the pixel circuit of at least one embodiment of the present disclosure as shown in FIG. 13 is in operation, Tc provides a low voltage signal, T2 is turned off, and at this time, the pixel circuit is in a hold frame F2 state:

in an initialization phase S81 included in the hold frame F2, NS (N−1) provides a high voltage signal, NS(N) provides a low voltage signal, PS(N) provides a high voltage signal, E1 provides a high voltage signal, T1 is turned off, I1 provides a first initial voltage Vi1, and T3 is turned on, so that Vi1 is written into the first node N1, and at the start of the data writing phase S82 included in the hold frame starts, T0 may be turned on; T4 is turned off; T8 is turned off, T7 is turned off, T5 and T6 are turned off;

in a data writing phase S82 included in the hold frame F2, NS (N−1) provides a low voltage signal, NS(N) provides a high voltage signal, PS(N) provides a low voltage signal, E1 provides a high voltage signal, I2 provides a second initial voltage Vi2, T1 is tuned off, T3 is turned off, and T4 is turned on, so that V1 is written into the anode of O1, and the anode of O1 is reset; T7 is turned on; T8 is tuned on; and T5 and T6 are turn off;

in a light-emitting phase S83 included in the hold frame F2, NS (N−1) provides a low voltage signal, NS(N) provides a low voltage signal, PS(N) provides a high voltage signal, E1 provides a low voltage signal, T1 is turned on, T3, T4, T7 and T8 are turned off, T5 and T6 are turned on, and O1 maintains the light-emitting state.

When the pixel circuit of at least one embodiment of the present disclosure as shown in FIG. 13 is in operation, in both the refresh frame and the hold frame, the gate electrode of T0 and the anode of O1 are reset, thereby reducing the brightness difference caused by the different resetting of the parasitic capacitance Co of O1 due to the refresh frame and the hold frame, as opposed to the threshold voltage shift process of T0.

At least one embodiment of the pixel circuit of the present disclosure as shown in 16 differs from at least one embodiment of the pixel drive circuit of the present disclosure as shown in FIG. 13 in that: T2 is a p-type thin film transistor.

Figure 16:
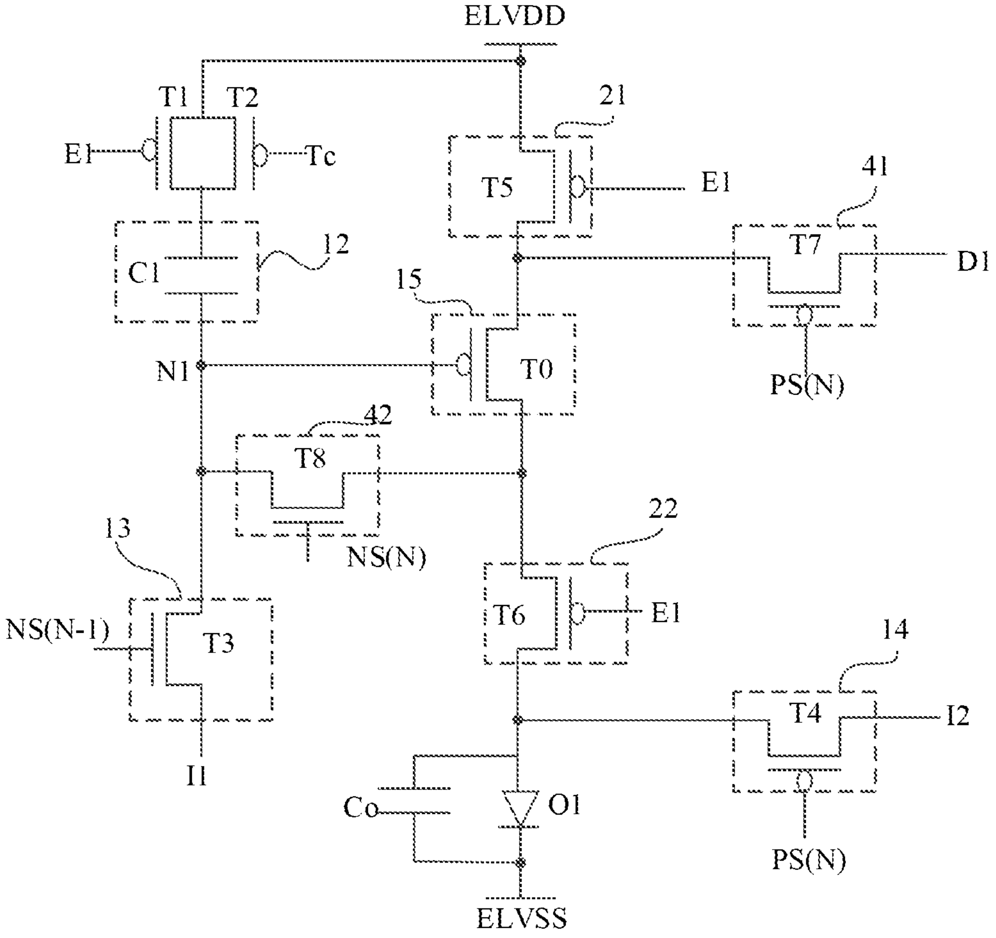
FIG. 16 is a circuit diagram of a pixel circuit according to at least one embodiment of the present disclosure.
Figure 17:
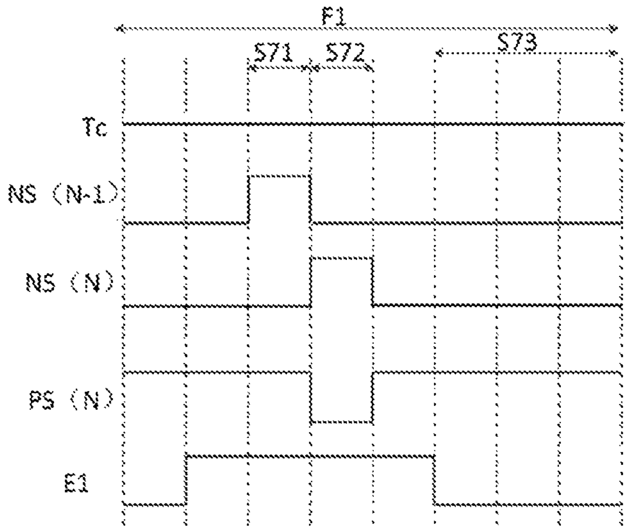
FIG. 17 is an operational timing diagram of the pixel circuit as shown in FIG. 16 in a refresh frame according to at least one embodiment of the present disclosure.

FIG. 17 is an operational timing diagram of at least one embodiment of the pixel circuit of the present disclosure as shown in FIG. 16 in the refresh frame F1; in the refresh frame F1, Tc provides a low voltage signal to turn on T2.

Figure 18:
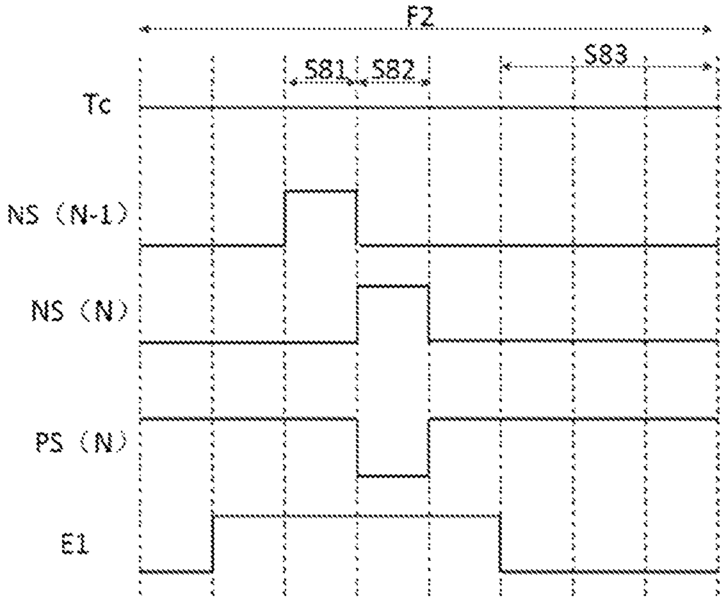
FIG. 18 is an operational timing diagram of the pixel circuit as shown in FIG. 16 in a hold frame according to at least one embodiment of the present disclosure.

FIG. 18 is an operational timing diagram of at least one embodiment of the pixel circuit of the present disclosure as shown in FIG. 16 in a hold frame F2; in the hold frame F2, Tc provides a high voltage signal to turn off T2.

When the pixel circuit of at least one embodiment of the present disclosure as shown in FIG. 13 is in operation, a light-emitting control line is used to control T1, and an additional GOA (gate driver on array) circuit is not required to be used to generate an energy storage control signal, so as to realize a narrow frame.

In at least one embodiment of the pixel circuit of the present disclosure shown in FIG. 13, The connection/disconnection control signal provided by Tc does not need to be generated by a GOA circuit, and all the pixel circuits included in the display panel can be connected to the same the connection/disconnection control signal; the connection/disconnection control signal is a signal for controlling refresh or hold, and when T2 is turned off, the pixel circuit is in a hold state; when T2 is turned on, the pixel circuit is in a refresh state.

A pixel drive method according to an embodiment of the present disclosure is applied to the pixel circuit described above. A display cycle of the pixel circuit includes a refresh frame and at least one hold frame, and the refresh frame and the hold frame each includes an initialization phase, a data writing phase, and a light-emitting phase; the pixel drive method includes:

in the refresh frame, the energy storage control circuit controlling a second terminal of an energy storage circuit to be connected to a first voltage terminal under control of the energy storage control signal;

in the initialization phase comprised in the hold frame and the data writing phase comprised in the hold frame, the energy storage control circuit controlling the second end of the energy storage circuit to be disconnected from the first voltage terminal under control of the energy storage control signal; and in the light-emitting phase comprised in the hold frame, the energy storage control circuit controlling the second end of the energy storage circuit to be connected to the first voltage terminal under control of the energy storage control signal.

In at least one embodiment of the present disclosure, the pixel circuit may further include a second initialization circuit, a data writing circuit and a compensation control circuit, the pixel drive method further includes:

in the initialization phase, the first initialization circuit writing a first initial voltage into the control terminal of the drive circuit under control of the first initialization control signal, so that at the start of the data writing phase, the drive circuit controls a first terminal of the drive circuit to be connected to a second terminal of the drive circuit under control of a potential of the control terminal of the drive circuit;

in the data writing phase, the second initialization circuit writing a second initial voltage into the first electrode of the light-emitting element under control of a second initialization control signal to reset the first electrode of the light-emitting element; and in the data writing phase comprised in the refresh frame, a data line providing a data voltage, and the data writing circuit writing the data voltage into the first terminal of the drive circuit under control of a writing control signal; the compensation control circuit controlling the control terminal of the drive circuit to be connected to the second terminal of the drive circuit under control of a compensation control signal.

In the pixel drive method according to at least one embodiment of the present disclosure, in both the refresh frame and the hold frame, the control terminal of the drive circuit and the first electrode of the light-emitting element are reset, so as to reduce the brightness difference between the refresh frame and the hold frame and improve the flicker phenomenon in low frequency display or variable frequency driving. The pixel circuit according to the embodiment of the present disclosure can realize low-frequency driving and reduce IC (integrated circuit) power consumption.

Optionally, the energy storage control circuit includes a first control sub-circuit and a second control sub-circuit; the pixel drive method according to at least one embodiment of the present disclosure includes:

in the refresh frame, the second control sub-circuit controlling the second end of the energy storage circuit to be connected to the first voltage terminal under control of a connection/disconnection control signal;

in the initialization phase comprised in the hold frame and the data writing phase comprised in the hold frame, the first control sub-circuit controlling the second end of the energy storage circuit to be disconnected from the first voltage terminal under control of the light-emitting control signal; the second control sub-circuit controlling the second end of the energy storage circuit to be disconnected from the first voltage terminal under control of the connection/disconnection control signal; and in the light-emitting phase comprised in the hold frame, the first control sub-circuit controlling the second end of the energy storage circuit to be connected to the first voltage terminal under control of a light-emitting control signal.

The display device described in this embodiment includes the pixel circuit described above.

The display device of at least one embodiment of the present disclosure may be an AMOLED (active matrix organic light-emitting diode) display device, but this is not limiting.

The display device provided by the embodiments of the present disclosure may be a mobile phone, a tablet computer, a television, a display, a notebook computer, a digital photo frame, a navigator, or any product or component with display functions.

While the foregoing is directed to the preferred embodiments of the present disclosure, it will be understood by those skilled in the art that numerous modifications and adaptations can be made without departing from the principles of the disclosure, and such modifications and adaptations are intended to be within the protection scope of the disclosure.

What is claimed is:

1. A pixel circuit, comprising: an energy storage control circuit, an energy storage circuit, a first initialization circuit, a second initialization circuit, a drive circuit, and a light-emitting element; wherein a display cycle of the pixel circuit comprises a refresh frame and at least one hold frame, and each of the refresh frame and the at least one hold frame comprises an initialization phase, a data writing phase, and a light-emitting phase;

the first initialization circuit is electrically connected to a first initialization control line, a first initial voltage terminal and a control terminal of the drive circuit, and is configured to write a first initial voltage provided by the first initial voltage terminal into the control terminal of the drive circuit under control of a first initialization control signal provided by the first initialization control line;

a first end of the energy storage circuit is electrically connected to the control terminal of the drive circuit, and the energy storage circuit is configured to store electric energy;

the energy storage control circuit is electrically connected to an energy storage control line, a second end of the energy storage circuit and a first voltage terminal, and is configured to control the second end of the energy storage circuit to be connected to the first voltage terminal under control of an energy storage control signal provided by the energy storage control line in the refresh frame, and to control the second end of the energy storage circuit to be disconnected from the first voltage terminal under control of the energy storage control signal in the initialization phase comprised in the hold frame and the data writing phase comprised in the hold frame;

the drive circuit is electrically connected to a first electrode of the light-emitting element; the drive circuit is configured to drive the light-emitting element under control of a potential of the control terminal of the drive circuit; and a second electrode of the light-emitting element is electrically connected to a second voltage terminal.

2. The pixel circuit according to claim 1, further comprising a second initialization circuit; wherein the second initialization circuit is electrically connected to a second initialization control line, a second initial voltage terminal and the first electrode of the light-emitting element, and is configured to write a second initial voltage provided by the second initial voltage terminal into the first electrode of the light-emitting element under control of a second initialization control signal provided by the second initialization control line.

3. The pixel circuit according to claim 1, further comprising a first light-emitting control circuit and a second light-emitting control circuit; wherein a second terminal of the drive circuit is electrically connected to the first electrode of the light-emitting element through the second light-emitting control circuit;

the first light-emitting control circuit is electrically connected to a light-emitting control line, the first voltage terminal and a first terminal of the drive circuit, and is configured to control the first voltage terminal to be connected to or disconnected from the first terminal of the drive circuit under control of a light-emitting control signal provided by the light-emitting control line; and the second light-emitting control circuit is electrically connected to the light-emitting control line, the second terminal of the drive circuit and the first electrode of the light-emitting element, and is configured to control the second terminal of the drive circuit to be connected to or disconnected from the first electrode of the light-emitting element under control of the light-emitting control signal.

4. The pixel circuit according to claim 3, wherein the energy storage control line comprises the light-emitting control line and a connection/disconnection control line; the energy storage control circuit comprises a first control sub-circuit and a second control sub-circuit;

the second control sub-circuit is electrically connected to the connection/disconnection control line, the first voltage terminal and the second end of the energy storage circuit, and is configured to control the connection or disconnection between the first voltage terminal and the second end of the energy storage circuit under control of a connection/disconnection control signal provided by the connection/disconnection control line; and the first control sub-circuit is electrically connected to the light-emitting control line, the first voltage terminal and the second end of the energy storage circuit, and is configured to control the first voltage terminal to be connected to or disconnected from the second end of the energy storage circuit under control of the light-emitting control signal in response to control of the second control sub-circuit.

5. The pixel circuit according to claim 1, wherein the energy storage control circuit comprises a first transistor;

a control electrode of the first transistor is electrically connected to the energy storage control line, a first electrode of the first transistor is electrically connected to the first voltage terminal, and a second electrode of the first transistor is electrically connected to the second end of the energy storage circuit.

6. The pixel circuit according to claim 4, wherein the first control sub-circuit comprises a first transistor, and the second sub-control circuit comprises a second transistor;

a control electrode of the first transistor is electrically connected to the light-emitting control line, a first electrode of the first transistor is electrically connected to the first voltage terminal, and a second electrode of the first transistor is electrically connected to the second end of the energy storage circuit; and a control electrode of the second transistor is electrically connected to the connection/disconnection control line, a first electrode of the second transistor is electrically connected to the first voltage terminal, and a second electrode of the second transistor is electrically connected to the second end of the energy storage circuit.

7. The pixel circuit according to claim 1, further comprising a data writing circuit and a compensation control circuit;

the data writing circuit is electrically connected to a writing control line, a data line and a first terminal of the drive circuit, and is configured to write a data voltage provided by the data line into the first terminal of the drive circuit under control of a writing control signal provided by the writing control line; and the compensation control circuit is electrically connected to a compensation control line, the control terminal of the drive circuit and a second terminal of the drive circuit, and is configured to control the control terminal of the drive circuit to be connected to or disconnected from the second terminal of the drive circuit under control of a compensation control signal provided by the compensation control line.

8. The pixel circuit according to claim 7, wherein the transistor comprised in the second initialization circuit and the transistor comprised in the data writing circuit are both p-type transistors, or the transistor comprised in the second initialization circuit and the transistor comprised in the data writing circuit are both n-type transistors; and the writing control line and the second initialization control line provide a same control signal.

9. The pixel circuit according to claim 2, wherein the first initialization circuit comprises a third transistor, and the second initialization circuit comprises a fourth transistor;

a control electrode of the third transistor is electrically connected to the first initialization control line, a first electrode of the third transistor is electrically connected to the first initial voltage terminal, and a second electrode of the third transistor is electrically connected to the control terminal of the drive circuit; and a control electrode of the fourth transistor is electrically connected to the second initialization control line, a first electrode of the fourth transistor is electrically connected to the second initial voltage terminal, and a second electrode of the fourth transistor is electrically connected to the first electrode of the light-emitting element.

10. The pixel circuit according to claim 3, wherein the first light-emitting control circuit comprises a fifth transistor, the second light-emitting control circuit comprises a sixth transistor, and the energy storage circuit comprises a storage capacitor;

a control electrode of the fifth transistor is electrically connected to the light-emitting control line, a first electrode of the fifth transistor is electrically connected to the first voltage terminal, and a second electrode of the fifth transistor is electrically connected to the first terminal of the drive circuit;

a control electrode of the sixth transistor is electrically connected to the light-emitting control line, a first electrode of the sixth transistor is electrically connected to the second terminal of the drive circuit, and a second electrode of the sixth transistor is electrically connected to the first electrode of the light-emitting element; and a first terminal of the storage capacitor is electrically connected to the control terminal of the drive circuit, and a second terminal of the storage capacitor is the second end of the energy storage circuit.

11. The pixel circuit according to claim 7, wherein the data writing circuit comprises a seventh transistor, and the compensation control circuit comprises an eighth transistor;

a control electrode of the seventh transistor is electrically connected to the writing control line, a first electrode of the seventh transistor is electrically connected to the data line, and a second electrode of the seventh transistor is electrically connected to the first terminal of the drive circuit; and a control electrode of the eighth transistor is electrically connected to the compensation control line, a first electrode of the eighth transistor is electrically connected to the control terminal of the drive circuit, and a second electrode of the eighth transistor is electrically connected to the second terminal of the drive circuit.

12. A pixel drive method, applied to the pixel circuit according to claim 1, wherein the display cycle of the pixel circuit comprises the refresh frame and at least one hold frame, and the refresh frame and the hold frame each comprises an initialization phase, a data writing phase, and a light-emitting phase; the pixel drive method comprises:

in the refresh frame, the energy storage control circuit controlling a second terminal of the energy storage circuit to be connected to a first voltage terminal under control of the energy storage control signal;

in the initialization phase comprised in the hold frame and the data writing phase comprised in the hold frame, the energy storage control circuit controlling the second end of the energy storage circuit to be disconnected from the first voltage terminal under control of the energy storage control signal; and in the light-emitting phase comprised in the hold frame, the energy storage control circuit controlling the second end of the energy storage circuit to be connected to the first voltage terminal under control of the energy storage control signal.

13. The pixel drive method according to claim 12, wherein the pixel circuit further comprises a second initialization circuit, a data writing circuit and a compensation control circuit; the pixel drive method further comprises:

in the initialization phase, the first initialization circuit writing a first initial voltage into the control terminal of the drive circuit under control of the first initialization control signal, so that at the start of the data writing phase, the drive circuit controls a first terminal of the drive circuit to be connected to a second terminal of the drive circuit under control of a potential of the control terminal of the drive circuit;

in the data writing phase, the second initialization circuit writing a second initial voltage into the first electrode of the light-emitting element under control of a second initialization control signal to reset the first electrode of the light-emitting element; and in the data writing phase comprised in the refresh frame, providing a data voltage through a data line, and the data writing circuit writing the data voltage into the first terminal of the drive circuit under control of a writing control signal; the compensation control circuit controlling the control terminal of the drive circuit to be connected to the second terminal of the drive circuit under control of a compensation control signal.

14. The pixel drive method according to claim 12, wherein the energy storage control circuit comprises a first control sub-circuit and a second control sub-circuit; the pixel drive method comprises:

in the refresh frame, the second control sub-circuit controlling the second end of the energy storage circuit to be connected to the first voltage terminal under control of a connection/disconnection control signal;

in the initialization phase comprised in the hold frame and the data writing phase comprised in the hold frame, the first control sub-circuit controlling the second end of the energy storage circuit to be disconnected from the first voltage terminal under control of the light-emitting control signal; the second control sub-circuit controlling the second end of the energy storage circuit to be disconnected from the first voltage terminal under control of the connection/disconnection control signal; and in the light-emitting phase comprised in the hold frame, the first control sub-circuit controlling the second end of the energy storage circuit to be connected to the first voltage terminal under control of a light-emitting control signal.

15. A display device, comprising the pixel circuit according to claim 1.

* * * * *